United States Patent
Mihalko

Patent Number: 5,717,590
Date of Patent: Feb. 10, 1998

[54] ADAPTIVE VARIABLE ASSIST STEERING CONTROL

[75] Inventor: Larry Stephen Mihalko, Farmington Hills, Mich.

[73] Assignee: General Motors Corporation, Detroit, Mich.

[21] Appl. No.: 528,824

[22] Filed: Sep. 15, 1995

[51] Int. Cl.[6] ........................................... B62D 5/04
[52] U.S. Cl. ..................... 364/424.051; 364/424.052; 180/443; 180/446
[58] Field of Search ............... 364/424.051, 424.052, 364/424.053, 424.054; 180/443, 446, 423, 422, 412, 415

[56] References Cited

U.S. PATENT DOCUMENTS

| | | | |
|---|---|---|---|
| 4,498,036 | 2/1985 | Salemka | 318/561 |
| 4,541,499 | 9/1985 | Yanai et al. | 180/142 |
| 4,666,013 | 5/1987 | Shibahata et al. | 180/141 |
| 4,702,335 | 10/1987 | Cage et al. | 180/423 |
| 4,830,127 | 5/1989 | Ito et al. | 364/424.052 |
| 4,834,203 | 5/1989 | Takahashi et al. | 180/446 |
| 4,875,540 | 10/1989 | Oshita et al. | 180/446 |
| 5,029,660 | 7/1991 | Raad et al. | 180/143 |
| 5,040,629 | 8/1991 | Matsuoka et al. | 180/446 |
| 5,072,803 | 12/1991 | Kilian et al. | 364/424.051 |
| 5,076,381 | 12/1991 | Daido et al. | 364/424.051 |
| 5,097,918 | 3/1992 | Daido et al. | 180/446 |
| 5,122,958 | 6/1992 | Eto et al. | 364/424.051 |
| 5,528,497 | 6/1996 | Yamamoto et al. | 364/424.051 |
| 5,541,841 | 7/1996 | Tanaka | 364/424.051 |

*Primary Examiner*—Kevin J. Teska
*Assistant Examiner*—Tan Nguyen
*Attorney, Agent, or Firm*—Anthony Luke Simon

[57] ABSTRACT

An adaptive variable assist steering control for use in a vehicle with a steering system that provides variable assist steering responsive to a steering assist command, comprising the steps of measuring vehicle lateral acceleration periodically over a period of time, integrating a magnitude of the measured lateral acceleration during the period of time to determine an integrator result, determining a modification command responsive to the integrator result, and modifying the steering assist command responsive to the modification command wherein the steering assist command adaptively responds to vehicle driving conditions.

8 Claims, 3 Drawing Sheets

ADAPTIVE VARIABLE ASSIST STEERING CONTROL

This invention relates to an adaptive variable assist steering control method and apparatus.

BACKGROUND OF THE INVENTION

Several variable assist steering systems are known to those skilled in the art, some of which are implemented in production automotive vehicles. One typical variable assist steering system varies steering effort according to vehicle speed. During low speed maneuvering, such as in parking lots, the control system provides for lighter driver steering efforts since parking lots typically require a lot of steering wheel turning. During higher vehicle speeds, such as road and highway speeds, the system requires higher driver steering wheel efforts. This is thought to provide the driver with "road-feel."

Some systems additionally modify driver steering wheel effort responsive to other vehicle parameters such as steering wheel position or vehicle lateral acceleration. For example, during a high lateral acceleration cornering maneuver, steering wheel effort is increased.

SUMMARY OF THE PRESENT INVENTION

An adaptive variable assist steering control method according to this invention is characterized by the features specified in claim 1.

Advantageously, this invention provides a variable assist steering control that adaptively responds to how a vehicle is being driven.

Advantageously, this invention tracks certain vehicle parameters over a period of time to determine how the vehicle is being driven during that time and adaptively modifies steering effort responsive to how the vehicle is being driven.

Advantageously, this invention operates by providing a measure of vehicle operation indicating whether the vehicle is being driven on roads with many high lateral acceleration turns or is being driven on a relatively straight road with low lateral acceleration turning. This invention then adapts the variable effort steering to the measured vehicle operation.

Advantageously, according to this invention, an integration of measured or computed vehicle lateral acceleration is used as the measure of vehicle operation. This invention uses the integrated lateral acceleration to develop a command modifier, which, vis-à-vis the integrated lateral acceleration, is adaptively responsive to vehicle operation. The command modifier is used to modify the variable assist steering command, effecting the adaptive variable assist steering control according to this invention.

In a first preferred example, this invention provides, in a vehicle with a variable assist steering system with a first mode of operation in which a variable assist command controls a steering wheel effort, wherein the steering wheel effort is increased in a continuous function as a vehicle speed increases, a method of operating the variable assist steering system including a second mode of operation comprising the steps of monitoring at least one vehicle operating condition over a period of time, adaptively switching into the second mode of operation when the operating condition detects driving requiring repeated turning maneuvers during the period of time and out of the second mode of operation when the operating condition detects driving substantially not requiring repeated turning maneuvers during the period of time, and when in the second mode of operation, modifying the variable assist command, wherein the steering wheel effort in the second mode of operation varies from the steering wheel effort in the first mode of operation. In examples where it is desirable to decrease operator steering effort during repeated turning maneuvers, the variation decreases operator steering wheel effort during the second mode of operation. In examples where it is desirable to increase operator steering effort during repeated turning maneuvers, the variation increases operator steering wheel effort during the second mode of operation.

In a second preferred example, this invention provides an adaptive variable assist steering control for use in a vehicle with a steering system that provides variable assist steering responsive to a steering assist command, comprising the steps of: measuring vehicle lateral acceleration periodically over a period of time; integrating a magnitude of the measured lateral acceleration during the period of time to determine an integrator result; determining a modification command responsive to the integrator result; and modifying the steering assist command responsive to the modification command wherein the steering assist command adaptively responds to vehicle driving conditions.

BRIEF DESCRIPTION OF THE DRAWINGS

The present invention will now be described by way of example with reference to the accompanying drawings in which.

DETAILED DESCRIPTION OF THE INVENTION

Figure 1:
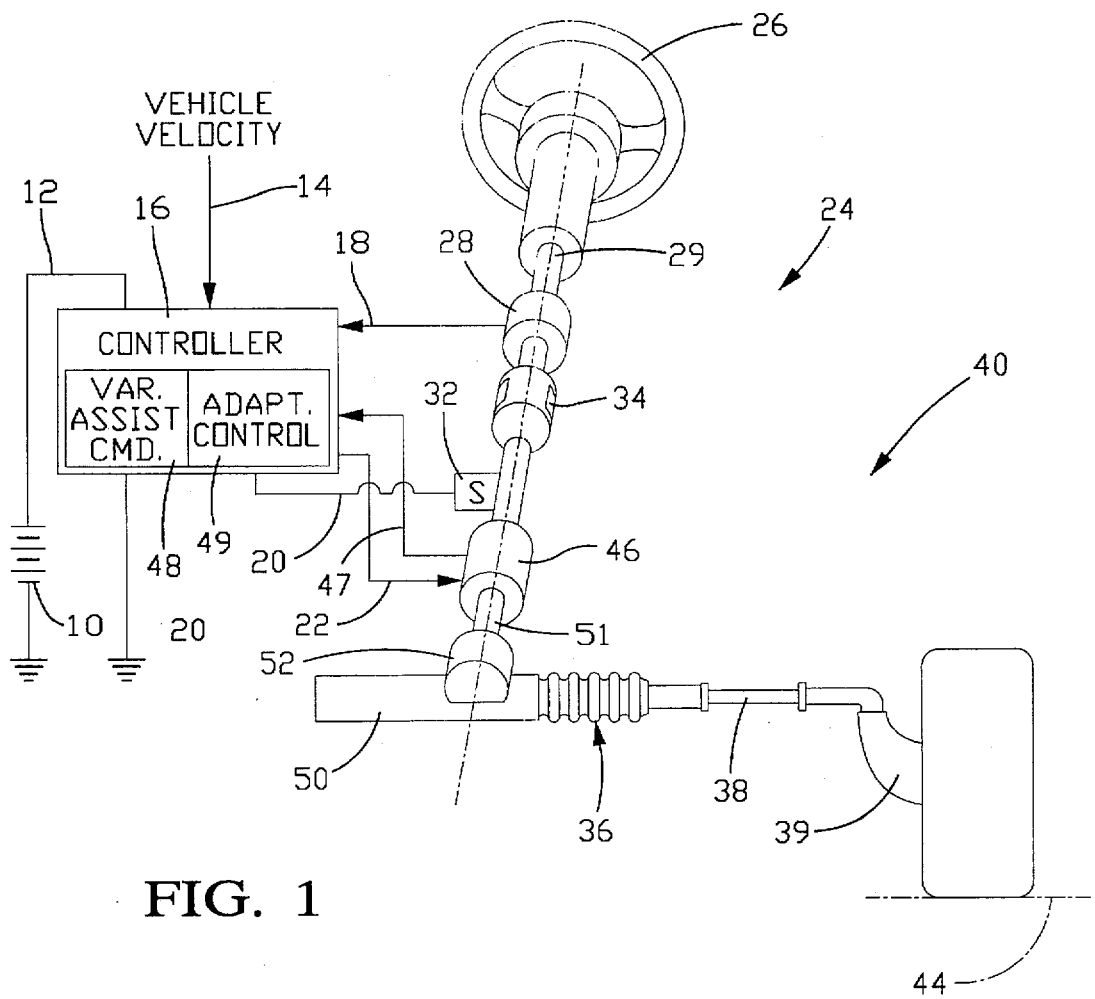
FIG. 1 is a schematic illustration of an apparatus according to this invention.

Referring to FIG. 1, reference numeral 40 generally designates a motor vehicle power steering system suitable for implementation of this invention. The example steering mechanism 36 is a rack and pinion type system that includes a toothed rack (not shown) and a pinion gear (also not shown) located on the gear housing 52. As the steering wheel 26 is turned, the steering shaft 29 turns and the lower steering shaft 51, connected to the upper steering shaft 29 through universal joint 34, turns the pinion gear. Rotation of the pinion gear moves the rack, which moves tie rods 38 (only one shown), in turn moving steering knuckles 39 (only one shown), which turn wheels 42 (only one shown).

The variable assist steering is provided through the unit generally designated by reference numeral 24 and includes the controller 16 and variable assist unit 46. The controller 16 is powered by the electric vehicle power supply 10 through line 12. The controller 16 receives a signal representative of vehicle velocity on line 14. Steering pinion gear angle is measured through position sensor 32, which may be an optical encoding type sensor, variable resistance type sensor, or any other suitable type of position sensor. Line 20 provides the measured steering pinion gear angle to the controller 16.

As the steering wheel 26 is turned, torque sensor 28 senses the torque applied to the steering wheel 26 by the vehicle operator. Torque sensor 28 may include a torsion bar (not shown) and a sensor such as a variable resistive type sensor (also not shown) which outputs a variable resistance signal to controller 16 through line 18 in relation to the amount of twist on the torsion bar. In response to the turning of the steering wheel and the inputs on lines 14, 18, and 20, the system provides assist to the operator steering efforts and the amount of that assist is controlled by a control command on line 22 provided to the variable assist unit 46. Feedback from variable assist unit 46 may be provided on line 47 if desired.

For purposes of this invention, the variable assist unit 46 is considered generic as there are many types of variable assist units known to those skilled in the art. Some units use hydraulic pressure to assist operator steering in a manner known to those skilled in the art, in which case, the assist command on line 22 operates to control the amount of hydraulic assist provided to the assist unit 46 and thereby to control the amount of assist to the operator input on steering wheel 26.

In another example type of unit known to those skilled in the art, steering assist is provided in the conventional manner through hydraulic assist and that steering assist is varied by use of an electromagnetic actuator. The electromagnetic actuator adds torque to the steering column, when desired, to increase the steering effort felt by the operator on steering wheel 26.

In yet another type of variable assist power steering system, torque assist is provided by an electric motor that is coupled to the steering column through means of a gear and/or ball screw and ball nut. Variable assist steering is achieved by varying the torque output of the motor in the desired manner.

Since examples of all of these types of power steering systems are known to those skilled in the art and their implementation details are not necessary for understand of the improvements according to this invention, further details of such systems will not be set forth herein. However, it is understood by those skilled in the art that the torque assist unit 46 is generic and could encompass any type of variable torque assist unit known to those skilled in the art, the control inputs of which are modified, according to the teachings of this invention as set forth herein.

More particularly, the controller 16 generates a variable assist command according to any one of a number of approaches known to those skilled in the art. This is denoted by reference 48. Reference 49 denotes that, according to this invention, the controller 16 modifies the variable assist command in response to driving conditions of the vehicle to provide the adaptive variable assist according to this invention. More particularly, the adaptive control 49 monitors the frequency and severity of vehicle lateral acceleration over a predetermined time period. The lateral acceleration may be sensed directly from a lateral acceleration sensor or computed based on vehicle velocity on line 14 and steering wheel angle on line 20. The adaptive control 49 tracks the lateral acceleration by integrating the magnitude of the lateral acceleration at each control loop of the adaptive control 49. The integrator is also provided with a decay function so that when lateral acceleration stops frequently occurring or decreases in magnitude, the integrator is allowed to decay. Thus, during periods of repeated moderate or hard turning maneuvers, the integrator output increases from zero up to its maximum output. During periods of mild, infrequent turning maneuvers, the integrator output decays to substantially zero. The integrator output is then used as a command modifier to the variable assist command to adaptively modify the variable assisted steering.

EXAMPLE 1

In a vehicle being driven down a winding road, the standard variable assisted steering implemented by control 48 increases steering assist during low speed conditions such as in a vehicle parking lot. This reduces the operator effort to navigate the parking lot. Control 48 also decreases assist, increasing the mount of operator input torque necessary on steering wheel 26 to perform turning maneuvers at road speeds and during moderate and high lateral acceleration turning.

According to this invention, adaptive control 49 monitors vehicle driving conditions and detects when the vehicle is being driven on a road that requires repeated turning maneuvers. The detection of the vehicle being driven down the road requiring repeated turning maneuvers is signaled by an increase in the magnitude of the lateral acceleration integrator output. The control 49 uses the integrator output to modify the assist command generated by control 48 so that the operator's steering effort is decreased while the vehicle remains driving on the road requiring the repeated turning maneuvers. This adaptive response according to this invention decreases the steering wheel torque required by the vehicle operator to drive the vehicle down the winding road. When the adaptive control 49 ceases detecting that the vehicle is being driven down the winding road but is now on more straight roads with gentler turns, the variable assist response adaptively returns to that commanded by control 48.

EXAMPLE 2

Figure 2:
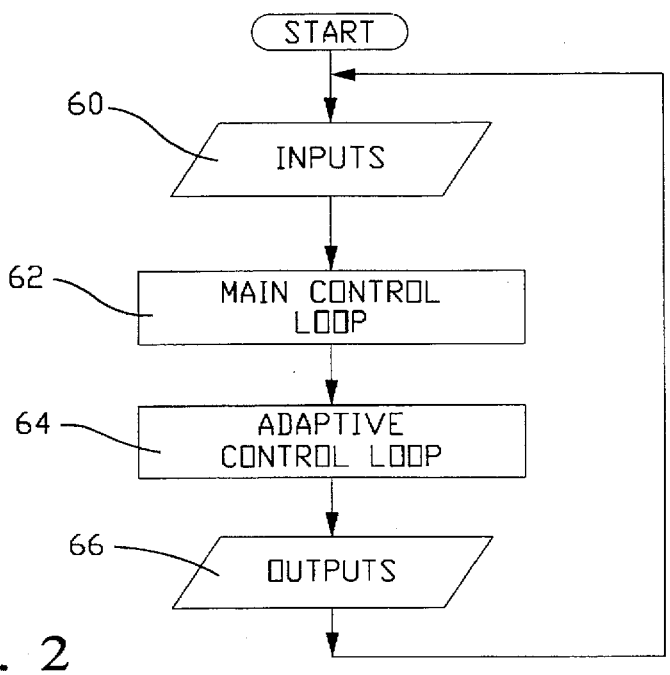
FIG. 2 illustrates a main flow control diagram according to this invention.

In a vehicle in which designers desire to include a "sporty" feel, when the adaptive control 49 according to detects a pattern of driving including repeated turning maneuvers, the adaptive control 49 alters the variable assist command output by the control 48 to require more operator effort on steering wheel 26. This may provide the vehicle operator with a sportier "feel" during the turning maneuvers Referring now to FIG. 2, an example main control routine for controller 16 to provide the adaptive variable assist steering control according to this invention is shown. The routine starts and moves to block 60 where the controller receives the various system inputs including the vehicle velocity, steering wheel torque, steering wheel position, actuator feedback (if any) and any other parameters known for use in variable assist steering controls.

Block 62 represents, generically, a set of computer control commands for determining a base variable assist control command. For purposes of this invention, block 62 is considered generic and may be any variable assist command routine known to those skilled in the art. Therefore further details of block 62 need not be set forth herein. Block 64 represents a set of computer control commands for providing adaptive control according to this invention. As a result of block 64, the base variable assist control command generated at block 62 is adaptively modified according to this invention in response to vehicle driving conditions as described herein.

At block 66 the modified variable assist commands are output in a known manner and the routine, after doing general housekeeping and diagnostics functions of a type known to those skilled in the art, repeats the control loop.

Figure 3:
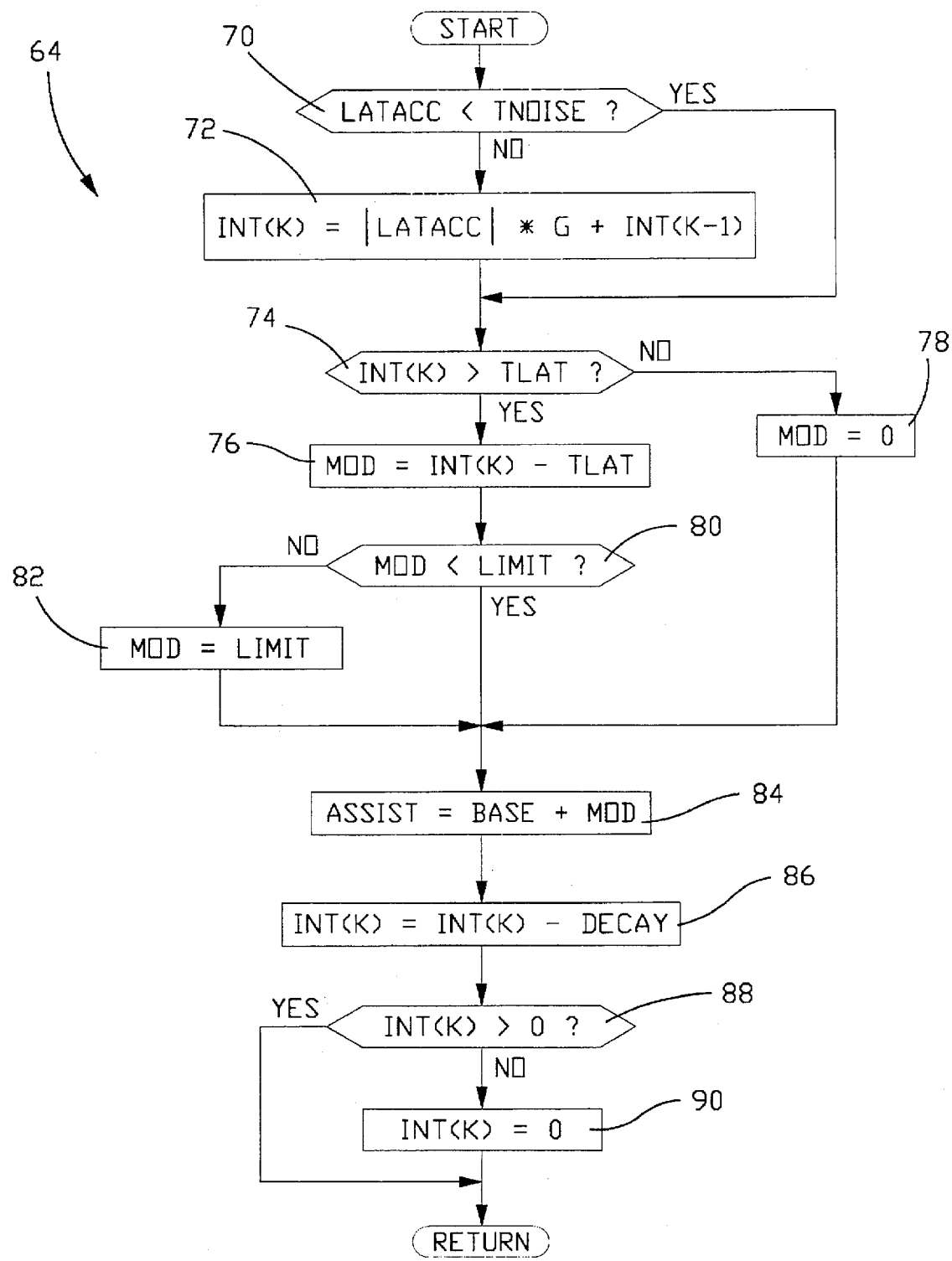
FIG. 3 illustrates a computer flow diagram for implementing this invention.

Referring now to FIG. 3, a preferred example of the set of adaptive control commands at block 64 are shown in more detail. More particularly, the routine starts at block 70 where it compares measured vehicle lateral acceleration, LATACC, to a noise threshold TNOISE. In implementations in which lateral acceleration is directly measured from an accelerometer mounted in the vehicle, TNOISE is set equal to or above the threshold of sensor noise output so that sensor noise does not trigger a response of the control system. If the measured lateral acceleration is less than the noise threshold at block 70 then the routine continues to block 74. Otherwise, the routine moves to block 72 where the lateral acceleration integrator is updated.

The lateral acceleration integrator is updated according to the following equation:

$$INT(k)=|LATACC|* G+INT(k-1)$$

where INT(k) is the updated lateral acceleration integrator value, G is a predetermined gain and INT(k-1) is the integrator value determined during the previous loop of the control program. The gain value G is set by the system and controls the rate at which the lateral acceleration integrator increases in value when the vehicle begins high lateral acceleration turning maneuvers.

The routine then moves to block 74 where it compares the lateral acceleration integrator to an integrator threshold TLAT. An integrator value, INT(k), that is not greater than TLAT indicates that the vehicle has not been in turning maneuvers enough to trigger adaptive modification of the variable assist control command. Thus at block 74 if the test has failed, the routine moves to block 78 where the command modifier, MOD, is set equal to zero and from block 78 to block 84 discussed further below. If at block 74 the value of the integrator, INT(k), is greater than the threshold, TLAT, the system begins the adaptive modification of the variable assist command according to this invention. More particularly, at block 76 the command modifier MOD is determined according to the difference between the lateral acceleration integrator and the threshold, TLAT.

At block 80, the command modifier is compared to an upper threshold limit. If the command modifier is not less than the limit, then the routine moves to block 82 where it sets the command modifier MOD equal to the threshold limit. The routine then continues to block 84 where the variable assist command, BASE, determined at block 62 (FIG. 2) is modified by the command modifier, MOD, according to the equation:

$$ASSIST=BASE+MOD,$$

where ASSIST is the modified control command. In driving conditions during which MOD is set to zero, the command ASSIST is set equal to BASE, resulting in no modification of the base variable assist command.

Block 86 implements a decay to the integrator so that, when turning maneuvers cease, the integrator eventually decays down to zero, causing the controller outputs to revert to the base control commands determined at block 62. More particularly, block 86 updates the value of the lateral acceleration integrator according to the equation:

$$INT(k)=INT(k)-DECAY$$

where the value DECAY sets the decay rate of the integrator. At block 88 the lateral acceleration command integrator is compared to zero. If the command integrator is not greater than zero, then block 90 sets the lateral acceleration integrator equal to zero. The routine then returns out of the adaptive control loop and provides the output signal controlling the variable assist steering system according to the modified variable assist command, ASSIST, which is responsive to the recent history of driving conditions of the vehicle as reflected by the lateral acceleration integrator.

Figure 4:
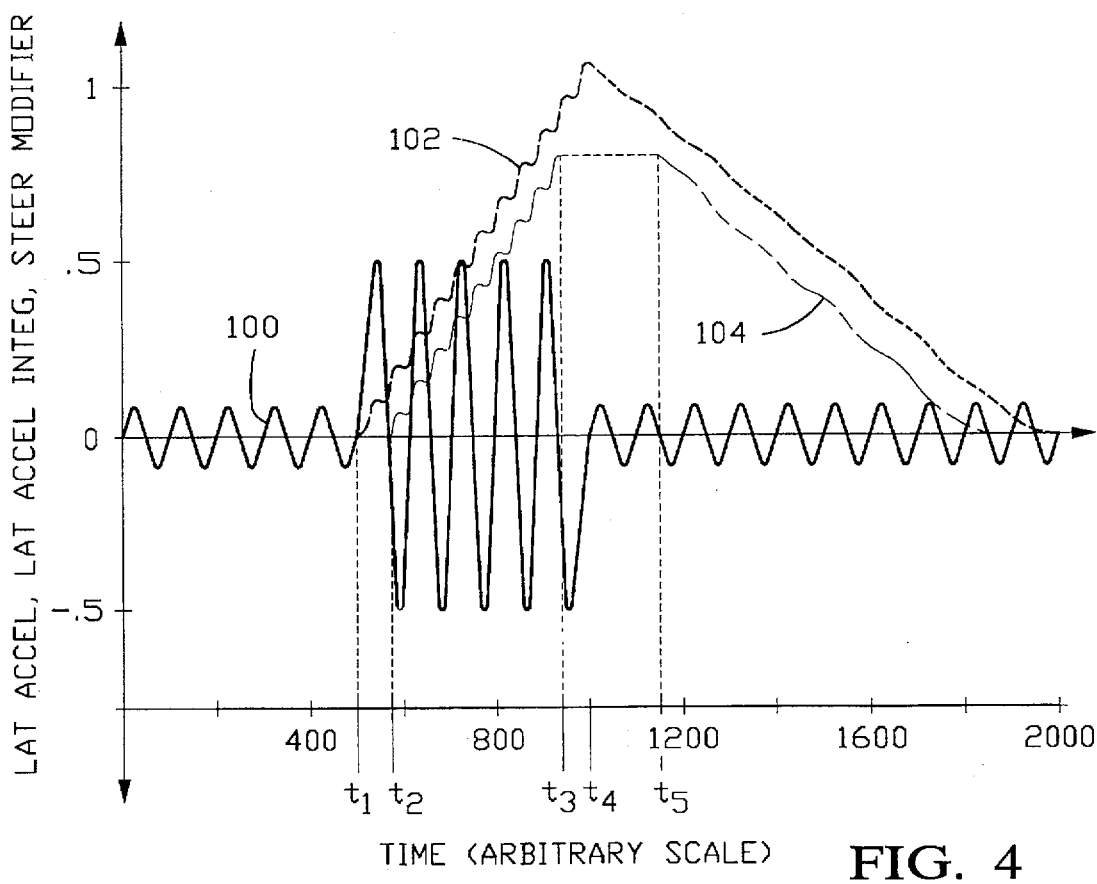
FIG. 4 illustrates example results according to this invention.

Referring now to FIG. 4, a simulation of the operation of this invention is shown. Trace 100 illustrates measured or computed lateral acceleration of the vehicle. At time $t_1$ the lateral acceleration increases indicating a series of high lateral acceleration turns (or a slalom maneuver) by the vehicle. Also at time $t_1$, the lateral acceleration integrator value represented by trace 102 begins increasing. At time $t_2$, the lateral acceleration integrator reaches the threshold, TLAT, and the command modifier, MOD, represented by trace 104, begins increasing. At time $t_3$, the command modifier reaches its maximum value and is thus saturated. At time $t_4$, the high lateral acceleration steering maneuvers cease and the integrator begins decreasing. At time $t_5$, the controller assumes that the high steering maneuvers are at an end and the modifier begins decreasing.

In FIG. 4, the rate at which the lateral acceleration integrator increases, is determined by the gain G. The time difference between $t_1$ and $t_2$ is determined by the gain G and the threshold TLAT. The rate of decay of the modifier after time $t_5$ is determined by the value DECAY.

It may be desirable to modify the control routine shown in FIG. 3 so that the variable assist command is not modified during a cornering maneuver, but is modified only between steering maneuvers so that consistent effort is felt during any one given cornering maneuver.

Additionally, the value of decay specifying the integrator decay rate may also be made adaptive based on the type of vehicle usage sensed. For example, if the vehicle has a long recent history of repeated moderate or high steering maneuvers, the decay rate may be set to a lower value to assume a slower decay rate than if the vehicle were in a short series of turning maneuvers. This would prevent the occasional straight patch of road in a series of winding road from prematurely decaying the modification command according to this invention. Additionally, the lateral acceleration integrator can be set to have a saturation value above which the integrator value cannot rise. If desired, the ripple in the integrator 102 and steering command modifier trace 104 can be eliminated by adding low pass filter function to one or both of those values.

Figure 5:
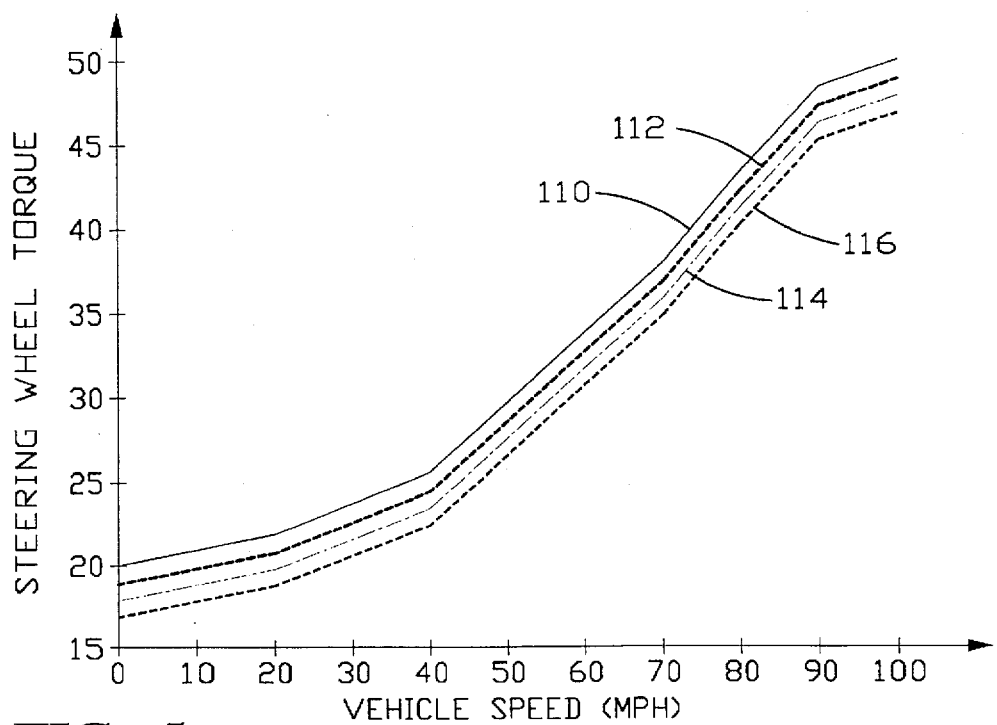
FIG. 5 illustrates example operation of this invention.

Referring now to FIG. 5, the graph shown illustrates vehicle speed on the horizontal axis versus operator steering wheel effort on the vertical axis. Trace 110 represents an example unmodified variable assist steering function according to a known control 48 (FIG. 1). As can be seen, the unmodified variable assist steering function trace 110 is a piece-wise linear continuous function in which steering wheel effort gradually increases with vehicle speed. Traces 112, 114 and 116 illustrate various adaptive responses according to this invention, resulting from control 49 (FIG. 1). More particularly, traces 112, 114 and 116 illustrate the effect of three different example values of the modification command, MOD, on the base variable assist steering effort function trace 110. In this example, the modification command is used to decrease operator steering effort as the lateral acceleration integrator output increases.

As can be seen, this invention advantageously provides adaptive control of the variable assist steering system in response, not only to instantaneously measured parameters, but to recent driving history of the vehicle. As explained above, the steering system modifier can be used to either increase or decrease steering effort in response to steering conditions involving repeated moderate or high lateral acceleration steering maneuvers to achieve the desired results as explained herein. In the example variable assist steering system that typically provides for greater steering effort at road speeds, the steering effort is reduced according to this invention when the vehicle experiences repeated turning maneuvers. In this example, the sign of the signals BASE and MOD are opposite so that MOD reduces the mount of driver effort necessary.

Those skilled in the art will realize that the above-described examples of this invention are embodied in a vehicle with a variable assist steering system with a first mode of operation wherein, responsive to a variable assist command, a first level of operator steering wheel effort is required during road speed operations of the vehicle and a second level of operator steering wheel effort is required during parking lot speed operations of the vehicle, wherein the first and second levels of operator steering wheel effort are not equal, also comprising a second mode of operation according to the steps of monitoring vehicle operating conditions, adaptively switching into the second mode of operation when the operating conditions detect driving requiring repeated turning maneuvers and out of the second mode of operation when the operating conditions detect driving substantially not requiring repeated turning maneuvers, and when in the second mode of operation, modifying the variable assist command, wherein a third level of operator steering wheel effort is required during road speed operations of the vehicle requiring repeated turning maneuvers, wherein the third level of steering wheel effort is not equal to the first level of steering wheel effort. Further apparent to those skilled in the art is that, according to this invention, the third level of operator steering wheel effort, in one example (i.e., EXAMPLE 1, above), is less than the first level of operator steering wheel effort and in another example (i.e., EXAMPLE 2, above) is greater than the first level of operator steering wheel effort.

I claim:

1. In a vehicle with a variable assist steering system with a first mode of operation wherein, responsive to a variable assist command, operator steering wheel effort increases during road speed operations of the vehicle and decreases during parking lot speed operations of the vehicle, the improvement comprising a second mode of operation according to the steps of:

monitoring vehicle operating conditions during a period of time;

adaptively switching into the second mode of operation when the operating conditions detect vehicle operation requiring repeated turning maneuvers during the period of time and out of the second mode of operation when the operating conditions detect vehicle operation substantially not requiring repeated turning maneuvers during the period of time; and when in the second mode of operation, modifying the variable assist command, wherein during road speed operations of the vehicle operator steering effort adaptively decreases for turning maneuvers in the second mode of operation compared to steering effort for turning maneuvers in the first mode of operation.

2. In a vehicle with a variable assist steering system with a first mode of operation wherein, responsive to a variable assist command, a first level of operator steering wheel effort is required during road speed operations of the vehicle and a second level of operator steering wheel effort is required during parking lot speed operations of the vehicle, wherein the first and second levels of operator steering wheel effort are not equal, the improvement comprising a second mode of operation according to the steps of:

monitoring vehicle operating conditions during a period of time;

adaptively switching into the second mode of operation when the operating conditions detect driving requiring repeated turning maneuvers during the period of time and out of the second mode of operation when the operating conditions detect driving substantially not requiring repeated turning maneuvers during the period of time; and when in the second mode of operation, modifying the variable assist command, wherein, a third level of operator steering wheel effort is required during road speed operations of the vehicle for turning maneuvers in the second mode of operation, wherein the third level of steering wheel effort is not equal to the first level of steering wheel effort for turning maneuvers during road speed operations of the vehicle in the first mode of operation.

3. An adaptive variable assist steering control for use in a vehicle with a steering system that provides variable assist steering responsive to a steering assist command, comprising the steps of:

measuring vehicle lateral acceleration periodically over a period of time;

integrating a magnitude of the measured lateral acceleration during the period of time to determine an integrator result;

determining a modification command responsive to the integrator result; and modifying the steering assist command responsive to the modification command wherein the steering assist command adaptively responds to vehicle driving conditions.

4. An adaptive variable assist steering control for use in a vehicle with a steering system that provides variable assist steering responsive to a steering assist command, comprising the steps of:

periodically measuring vehicle lateral acceleration, LATACC;

integrating the measured lateral acceleration to determine an integrator output according to:

$$INT(K) = |LATACC| * G + INT(K-1),$$

where INT(K) is a present value of the integrator output, INT(K−1) is a previous value of the integrator output and G is a predetermined gain;

determining a modification command, MOD, responsive to the integrator output;

modifying the steering assist command responsive to the modification command according to:

$$ASSIST = BASE + MOD,$$

where ASSIST is the modified steering assist command and BASE is the steering assist command; and decaying the integrator result according to:

$$INT(k) = INT(K) - DECAY,$$

wherein DECAY is a predetermined constant, wherein the steering assist command adaptively responds to vehicle driving conditions.

5. In a vehicle with a variable assist steering system with a first mode of operation wherein, responsive to a variable assist command, a first level of operator steering wheel effort is required during road speed operations of the vehicle and a second level of operator steering wheel effort is required during parking lot speed operations of the vehicle, wherein the first and second levels of operator steering wheel effort are not equal, the improvement comprising, an electronic controller comprising:

means for monitoring and recording vehicle operating conditions during a period of time;

means for adaptively switching into a second mode of operation when the recorded operating conditions indicate driving requiring repeated turning maneuvers during the period of time and for adaptively switching out of the second mode of operation when the recorded operating conditions indicate driving substantially not requiring repeated turning maneuvers during the period of time; and means for modifying the variable assist command when switched in the second mode of operation, wherein a third level of operator steering wheel effort is required during road speed operations of the vehicle for turning maneuvers in the second mode of operation, wherein the third level of steering wheel effort is not equal to the first level of steering wheel effort for turning maneuvers during road speed operations of the vehicle in the first mode of operation.

6. In a vehicle with a variable assist steering system with a first mode of operation in which a variable assist command controls a steering wheel effort, wherein the steering wheel effort is varied as vehicle speed increases, the improvement comprising a method of operating the variable assist steering system including the first mode of operation and a second mode of operation, wherein the second mode of operation comprises the steps of:

monitoring at least one vehicle operating condition over a period of time;

adaptively switching into the second mode of operation when the operating condition detects driving requiring repeated turning maneuvers during the period of time and out of the second mode of operation when the operating condition detects driving substantially not requiring repeated turning maneuvers during the period of time; and when in the second mode of operation, modifying the variable assist command, wherein the steering wheel effort for turning maneuvers during road speed operations of the vehicle in the second mode of operation varies from the steering wheel effort for turning maneuvers during road speed operations of the vehicle in the first mode of operation.

7. The method of operating a variable assist steering system according to claim 6, wherein an amount that the steering wheel effort in the second mode of operation varies from the steering wheel effort in the first mode of operation is determined responsive to the monitored operating condition.

8. The method of operating a variable assist steering system according to claim 6, wherein the monitored operating condition is represented by an integration of a vehicle lateral acceleration over the period of time.

* * * * *